United States Patent
Dubbels et al.

(10) Patent No.: US 9,697,099 B2
(45) Date of Patent: Jul. 4, 2017

(54) REAL-TIME OR FREQUENT INGESTION BY RUNNING PIPELINE IN ORDER OF EFFECTIVENESS

(71) Applicant: International Business Machines Corporation, Armonk, NY (US)

(72) Inventors: Joel C. Dubbels, Eyota, MN (US); Andrew R. Freed, Cary, NC (US); John E. Petri, St. Charles, MN (US); Michael W. Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 14/295,913

(22) Filed: Jun. 4, 2014

(65) Prior Publication Data

US 2015/0356456 A1    Dec. 10, 2015

(51) Int. Cl.
    *G06F 1/00*     (2006.01)
    *G06N 5/00*     (2006.01)
    *G06F 11/30*    (2006.01)
    *G06F 17/27*    (2006.01)
    *G06F 17/30*    (2006.01)

(52) U.S. Cl.
    CPC ........ *G06F 11/302* (2013.01); *G06F 17/2785* (2013.01); *G06F 17/30616* (2013.01); *G06F 17/30654* (2013.01)

(58) Field of Classification Search
    CPC ........... G06N 5/02; G06Q 10/06; G06Q 30/02
    See application file for complete search history.

(56) References Cited

U.S. PATENT DOCUMENTS

| | | | |
|---|---|---|---|
| 5,895,466 A | 4/1999 | Goldberg et al. |
| 5,918,222 A | 6/1999 | Fukui et al. |
| 6,856,986 B1 | 2/2005 | Rossides |
| 7,454,393 B2 | 11/2008 | Horvitz et al. |
| 7,783,473 B2 | 8/2010 | Bangalore et al. |
| 8,214,734 B2 | 7/2012 | Grabarnik et al. |

(Continued)

FOREIGN PATENT DOCUMENTS

| | | |
|---|---|---|
| CN | 101566998 | 10/2009 |
| CN | 102637192 | 8/2012 |

(Continued)

OTHER PUBLICATIONS

List of IBM or Patent Applications Treated as Related (Appendix P), 2 pages.

(Continued)

*Primary Examiner* — Michael B Holmes
*Assistant Examiner* — Kalpana Bharadwaj
(74) *Attorney, Agent, or Firm* — Stephen R. Tkacs; Stephen J. Walder, Jr.; William J. Stock

(57) ABSTRACT

A mechanism is provided in a data processing system for partial ingestion of content. The mechanism receives new content to be ingested into a corpus of information. The mechanism applies a plurality of sub-pipelines of annotation engines against the new content in order of effectiveness. The plurality of sub-pipelines include all annotation engines of an ingestion pipeline. Each sub-pipeline within the plurality of sub-pipelines generates one or more intermediate output objects. The mechanism provides access to the one or more intermediate output objects.

20 Claims, 7 Drawing Sheets

(56) References Cited

U.S. PATENT DOCUMENTS

| | | |
|---|---|---|
| 8,429,179 B1 | 4/2013 | Mirhaji |
| 9,141,660 B2 | 9/2015 | Clark et al. |
| 9,158,772 B2 | 10/2015 | Clark et al. |
| 9,158,773 B2 | 10/2015 | Clark et al. |
| 9,286,153 B2 | 3/2016 | Giffels et al. |
| 2007/0022109 A1 | 1/2007 | Imielinski et al. |
| 2009/0287678 A1 | 11/2009 | Brown et al. |
| 2010/0191686 A1 | 7/2010 | Wang et al. |
| 2011/0066587 A1 | 3/2011 | Ferrucci et al. |
| 2011/0125734 A1 | 5/2011 | Duboue et al. |
| 2011/0125783 A1 | 5/2011 | Whale et al. |
| 2011/0153312 A1 | 6/2011 | Roberts |
| 2011/0320187 A1 | 12/2011 | Motik et al. |
| 2012/0041950 A1 | 2/2012 | Koll et al. |
| 2012/0059816 A1 | 3/2012 | Narayanan et al. |
| 2012/0078890 A1 | 3/2012 | Fan et al. |
| 2012/0078891 A1 | 3/2012 | Brown et al. |
| 2012/0278321 A1 | 11/2012 | Traub et al. |
| 2013/0007055 A1 | 1/2013 | Brown et al. |
| 2013/0017524 A1 | 1/2013 | Barborak et al. |
| 2013/0018652 A1 | 1/2013 | Ferrucci et al. |
| 2013/0041921 A1 | 2/2013 | Cooper et al. |
| 2013/0066886 A1 | 3/2013 | Bagchi et al. |
| 2013/0110839 A1 | 5/2013 | Kirshenbaum |
| 2013/0216984 A1 | 8/2013 | Cantrell et al. |
| 2013/0344468 A1* | 12/2013 | Lindsay .............. G06Q 30/0201 434/322 |
| 2014/0006012 A1 | 1/2014 | Zhou et al. |
| 2014/0006448 A1 | 1/2014 | McCall |
| 2014/0120513 A1 | 5/2014 | Jenkins et al. |
| 2014/0149446 A1 | 5/2014 | Kuchmann-Beauger et al. |
| 2014/0172756 A1 | 6/2014 | Clark et al. |
| 2014/0272909 A1 | 9/2014 | Isensee et al. |
| 2014/0280087 A1 | 9/2014 | Isensee et al. |
| 2014/0298199 A1 | 10/2014 | Johnson, Jr. et al. |
| 2014/0365502 A1 | 12/2014 | Haggar et al. |
| 2015/0120718 A1 | 4/2015 | Luo et al. |
| 2015/0161106 A1 | 6/2015 | Barbetta et al. |
| 2015/0161230 A1 | 6/2015 | Alkov et al. |
| 2015/0169395 A1 | 6/2015 | Giffels et al. |
| 2015/0172293 A1 | 6/2015 | Bittner et al. |
| 2015/0235132 A1 | 8/2015 | Allen et al. |
| 2015/0278264 A1 | 10/2015 | Balani et al. |
| 2015/0339290 A1 | 11/2015 | Mueller et al. |
| 2015/0347587 A1 | 12/2015 | Allen et al. |
| 2015/0356456 A1 | 12/2015 | Dubbels et al. |
| 2016/0019280 A1 | 1/2016 | Unger et al. |
| 2016/0062735 A1* | 3/2016 | Wilber .............. G06F 17/30654 706/46 |

FOREIGN PATENT DOCUMENTS

| | | |
|---|---|---|
| CN | 103870528 | 6/2014 |
| WO | WO02/29618 A1 | 4/2002 |
| WO | WO2010/104970 A1 | 9/2010 |

OTHER PUBLICATIONS

High, Rob, "The Era of Cognitive Systems: An Inside Look at IBM Watson and How it Works", IBM Corporation, Redbooks, Dec. 12, 2012, 16 pages.

Yuan, Michael J., "Watson and healthcare, How natural language processing and semantic search could revolutionize clinical decision support", IBM developerWorks, IBM Corporation, Apr. 12, 2011, 14 pages.

List of IBM Patents or Patent Applications Treated as Related, Sep. 29, 2016, 2 pages.

* cited by examiner

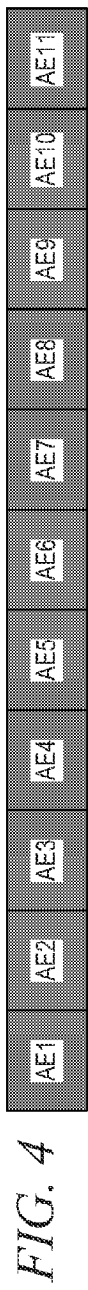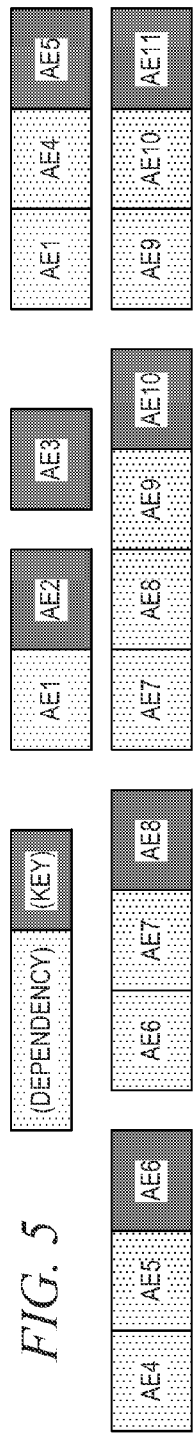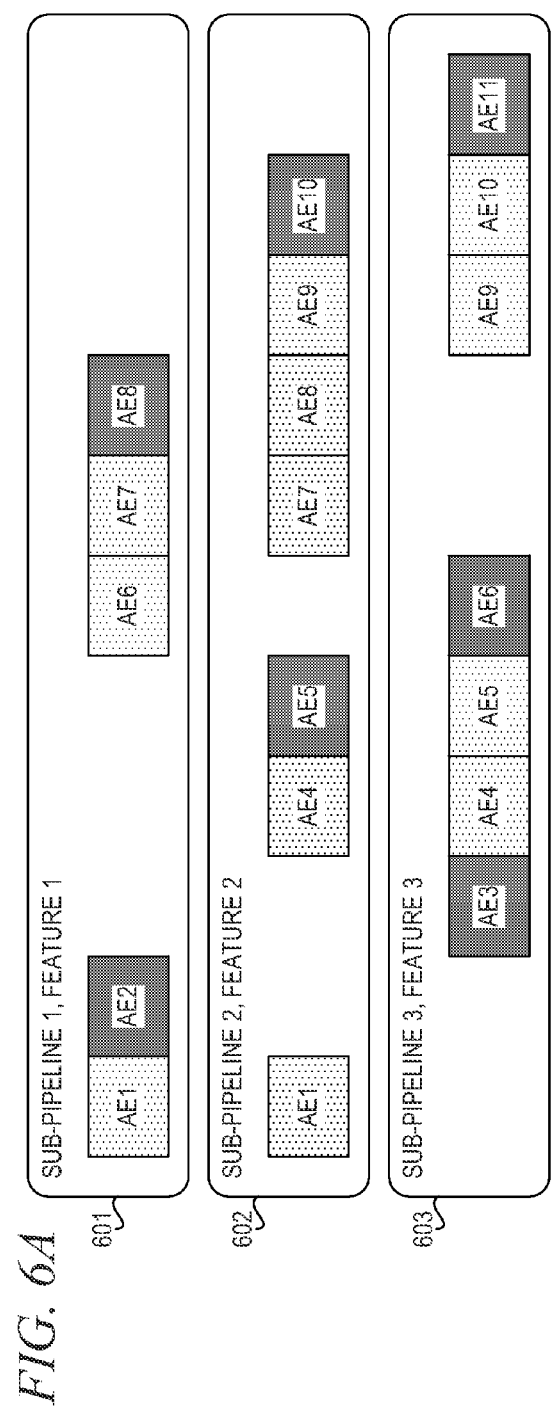

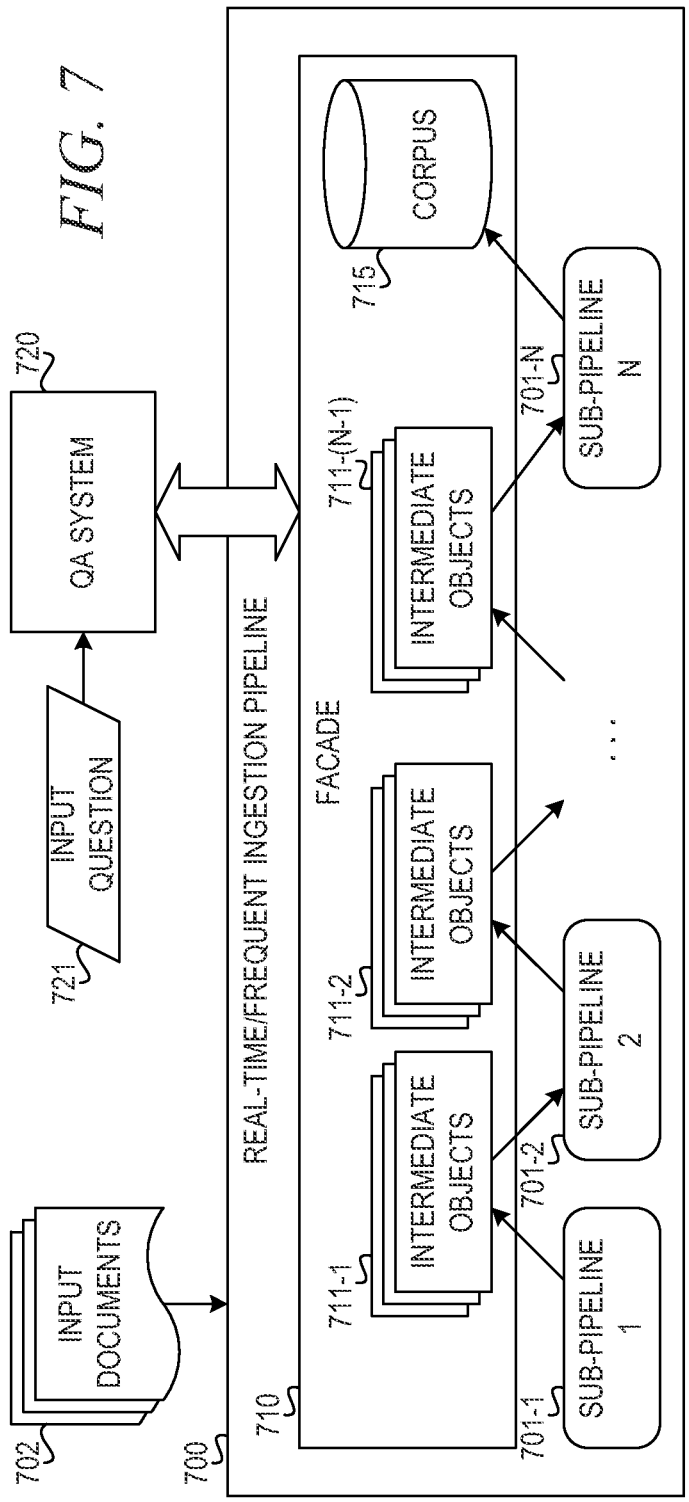

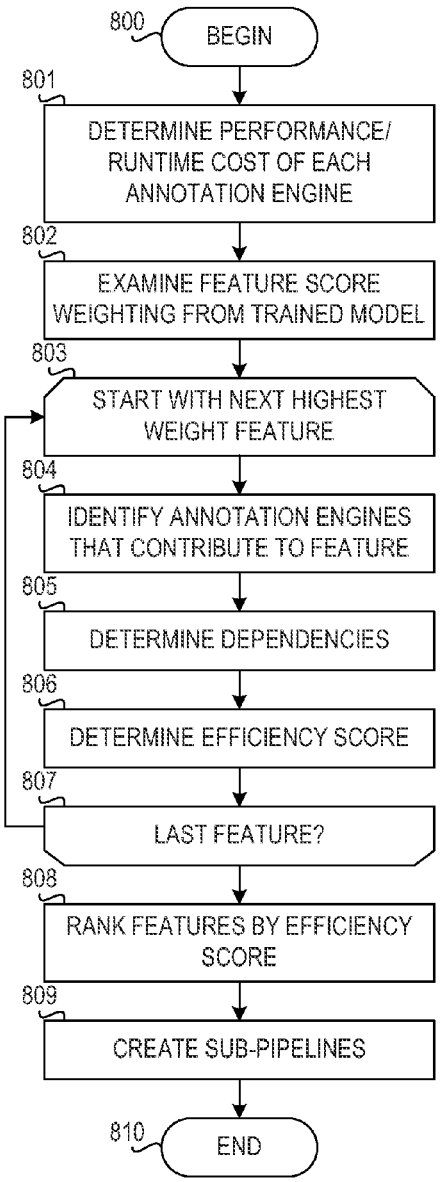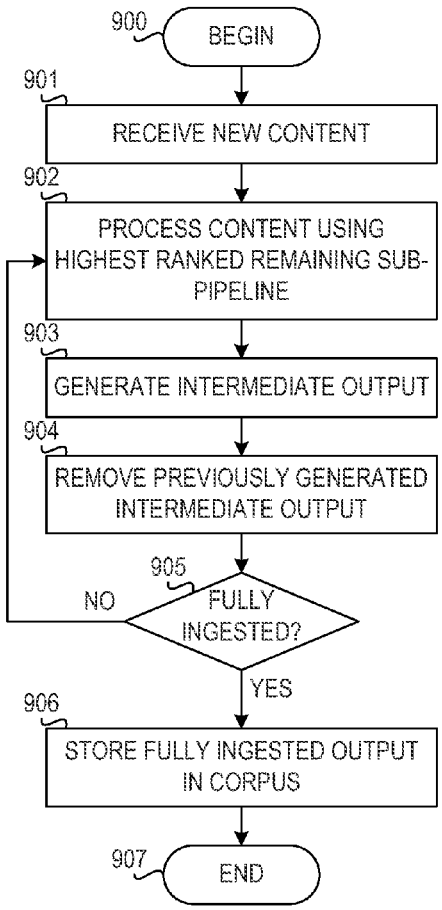

US 9,697,099 B2

REAL-TIME OR FREQUENT INGESTION BY RUNNING PIPELINE IN ORDER OF EFFECTIVENESS

BACKGROUND

The present application relates generally to an improved data processing apparatus and method and more specifically to mechanisms for real-time or frequent ingestion of content by running partial sub-pipelines in order of effectiveness.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system, is provided for partial ingestion of content. The method comprises receiving new content to be ingested into a corpus of information. The method further comprises applying a plurality of sub-pipelines of annotation engines against the new content in order of effectiveness. The plurality of sub-pipelines includes all annotation engines of an ingestion pipeline. Each sub-pipeline within the plurality of sub-pipelines generates one or more intermediate output objects. The method further comprises providing access to the one or more intermediate output objects.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts an example ingestion pipeline of annotation engines in accordance with an illustrative embodiment;

FIG. 5 depicts example dependencies in an ingestion pipeline in accordance with an illustrative embodiment;

FIGS. 6A and 6B illustrate dividing the ingestion pipeline into sub-pipelines for partial ingestion in accordance with an illustrative embodiment;

FIG. 7 is a block diagram illustrating a system for real-time or frequent ingestion by running sub-pipelines in order of effectiveness in accordance with an illustrative embodiment;

FIG. 8 is a flowchart illustrating operation of a mechanism for providing sub-pipelines for partial ingestion of content in accordance with an illustrative embodiment;

FIG. 9 is a flowchart illustrating operation of a mechanism for real-time or frequency ingestion of content into a corpus in accordance with an illustrative embodiment.

DETAILED DESCRIPTION

The illustrative embodiments provide a mechanism for real-time or frequent ingestion of content into a corpus by running partial sub-pipelines in order of effectiveness. Current solutions require fully ingesting all content at one time. In a rea-time or frequent ingestion scenario, it is inefficient for a question answering (QA) to wait for a typical full ingestion in order to add new data to the corpus. It is desirable to add information to the corpus as quickly as possible, even if the information is not fully refined, and then to refine the information over time.

For the purpose of ingesting new content quickly, if only partially, the illustrative embodiments determine the aspects of the ingestion pipeline with the highest ratio of importance to runtime and resource usage. The illustrative embodiments divide the ingestion pipeline into sub-pipelines. The mechanisms of the illustrative embodiments process new content using the sub-pipelines in order of effectiveness. The mechanisms of the illustrative embodiments expose the intermediate output files from new corpus content to the full corpus via a facade. As new content makes its way through the ingestion sub-pipelines, the facade exposes only the most recent intermediate outputs.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

Figure 1:
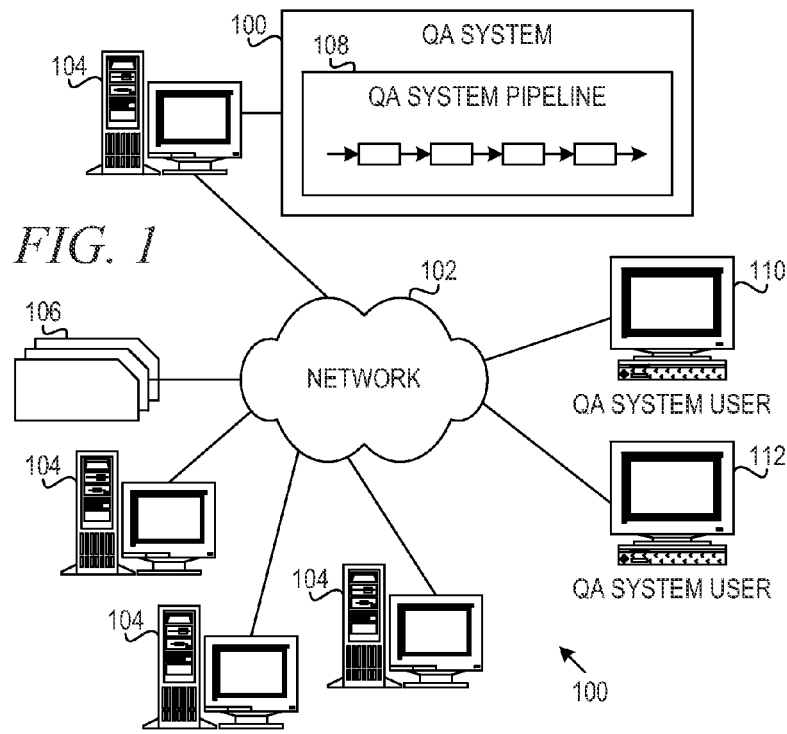
FIG. 1 depicts a schematic diagram of one illustrative embodiment of a question/answer creation (QA) system in a computer network.
Figure 2:
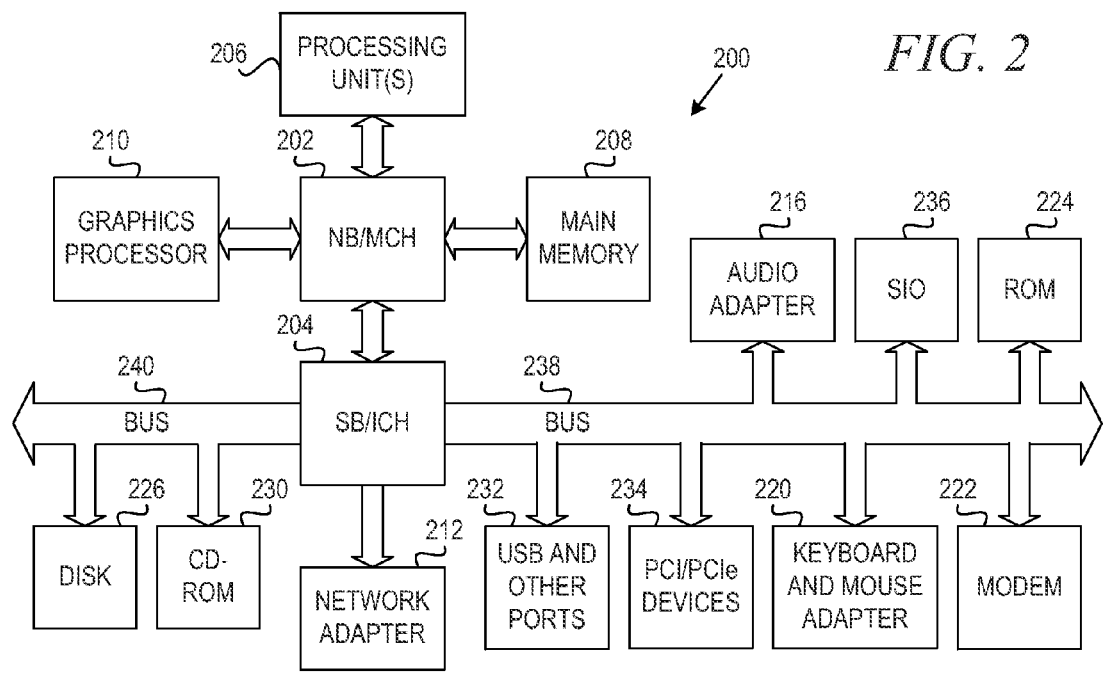
FIG. 2 is a block diagram of an example data processing system in which aspects of the illustrative embodiments may be implemented.
Figure 3:
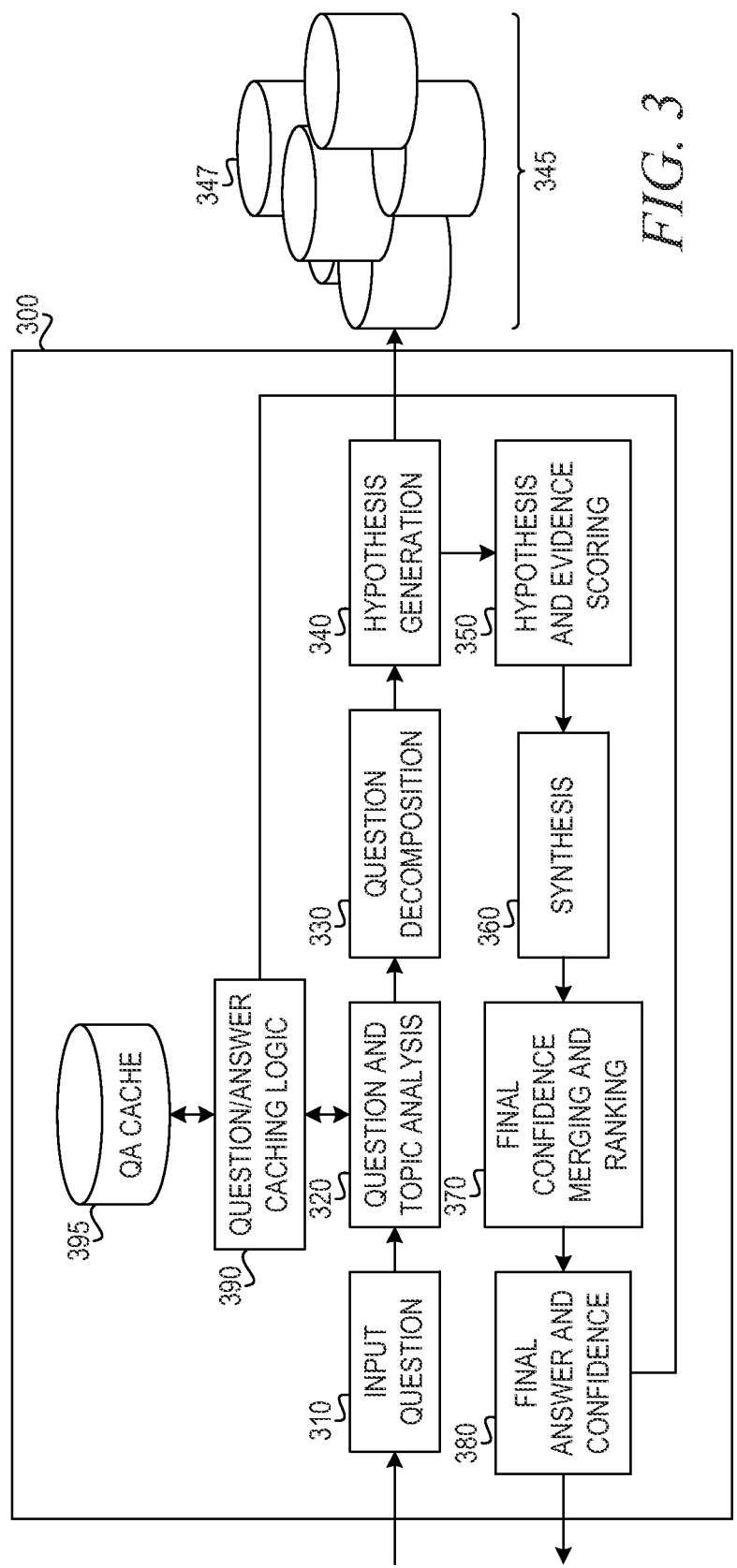
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question-and-answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enable question/answer (QA) generation functionality for one or more QA system users via their respective computing devices 110, 112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 is routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 to be answered by the content in the corpus of data 106. In one embodiment, the questions are formed using natural language. The QA system 100 interprets the question and provide a response to the QA system user, e.g., QA system user 110, containing one or more answers to the question. In some embodiments, the QA system 100 provides a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system receives an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms look at temporal or spatial features in the language, while others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model is then used to summarize a level of confidence that the Watson™ QA system has regarding the evidence that the potential response, i.e., candidate answer, is inferred by the question. This process is repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features are then used during the question decomposition stage 330 to decompose the question into one or more queries to be applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345.

There may be different corpora 347 defined for different collections of documents based on various criteria depending upon the particular implementation. For example, different corpora may be established for different topics, subject matter categories, sources of information, or the like. As one example, a first corpus is associated with healthcare documents while a second corpus is associated with financial documents. Alternatively, one corpus comprises documents published by the U.S. Department of Energy while another corpus comprises IBM Redbooks documents. Any collection of content having some similar attribute is considered to be a corpus 347 within the corpora 345.

As used herein, a "domain" is a technical, professional, or academic field having a corresponding corpus or source of information. For instance, one domain is a healthcare domain where a corresponding corpus for the domain includes healthcare documents and another domain is a financial domain where a corresponding corpus for the financial domain is a collection of financial documents.

The queries are applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus are then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the many relevance scores generated by the various reasoning algorithms are synthesized into confidence scores for the various hypotheses. This process involves applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370 which compares the confidence scores and measures, compare them against predetermined thresholds, or perform any other analysis on the confidence scores to determine which hypotheses/candidate answers are the most likely to be the answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

FIG. 4 depicts an example ingestion pipeline of annotation engines in accordance with an illustrative embodiment. In the depicted example, the ingestion pipeline comprises software engines, also referred to as annotation engines or annotators, AE1 to AE11. Each of the annotation engines performs a specialized function, such as parsing, counting, marking parts of speech, or more sophisticated natural language processing functions. The annotation engines produce output, referred to herein as "features," to be used by other annotation engines in the pipeline. These annotation engines process portions of information being added to the corpus or features produced by previous annotation engines in the pipeline.

FIG. 5 depicts example dependencies in an ingestion pipeline in accordance with an illustrative embodiment. If a particular annotation engine relies on features generated by a previous annotation engine in the pipeline, that engine is said to be dependent on the previous pipeline. In the depicted example, the annotation engine AE2 depends on the annotation engine AE1; the annotation engine AE3 does not have any dependencies; the annotation engine AE5 depends on annotation engines AE1 and AE4; the annotation engine AE6 depends on annotation engines AE4 and AE5; the annotation engine AE8 depends on the annotation engines AE6 and AE7; the annotation engine AE10 depends on the annotation engines AE7, AE8, and AE9; and, the annotation engine AE11 depends on the annotation engines AE9 and AE10.

In accordance with an illustrative embodiment, a mechanism determines the most important features in the QA system, the requirements to compute each of the features, and the cost of computing each of those features. From these measurements, the mechanism determines the features that provide the highest efficiency and divides the pipeline into sub-pipelines that generate those features. The mechanism performs a partial ingestion of new content to the QA system. As time allows, the mechanism advances from partial ingestion to full ingestion of the new content by continually running the highest value annotators that have not yet been run until all annotators have been run.

In an illustrative embodiment, the mechanism uses past performance data (e.g., gathered from MBeans) to determine the performance/runtime cost of each annotation engine. The mechanism examines the feature scoring weighting from a trained QA system model and ranks the features from highest to lowest scored. In one example embodiment, the mechanism uses the scoring weighting from a typical training run. In an alternative embodiment, the mechanism uses the scoring weighting from a subset of training questions with a given characteristic (e.g., current events, historical data, etc.). When the mechanism anticipates questions of a given characteristic, the mechanism runs partial ingestion tuned to that characteristic.

From the highest weighted feature to the lowest, the mechanism examines the inputs to that feature. One example of a mechanism for frequent question and answer analysis in a deep question answering system, which may be used in conjunction with the principles described herein, is described in U.S. patent application Ser. No. 13/717,043, filed Dec. 17, 2012, which is herein incorporated by reference in its entirety. Such a mechanism determines the key inputs to one type of question and averages out the results over a typical set of training questions The mechanism determines the annotation engines that contribute to each given feature or critical attributes, i.e., from oncology features, as well as the annotation engines on which those annotation engine depend. In one example embodiment, the mechanism determines dependencies using the metadata in the extensible markup language (XML) descriptors. Dependencies may be explicitly stated in the XML descriptors. In another example, the mechanism analyzes the Java™ code for references to annotation types. The mechanism then determines dependency trees for each feature.

For each dependency tree, the mechanism generates an efficiency score. In one example embodiment, the mechanism calculates the efficiency score as follows:

$$\text{efficiency\_score} = \frac{\text{feature\_scoring\_weighting}}{\text{time\_to\_run\_all\_annotators}}.$$

Figure 6B:
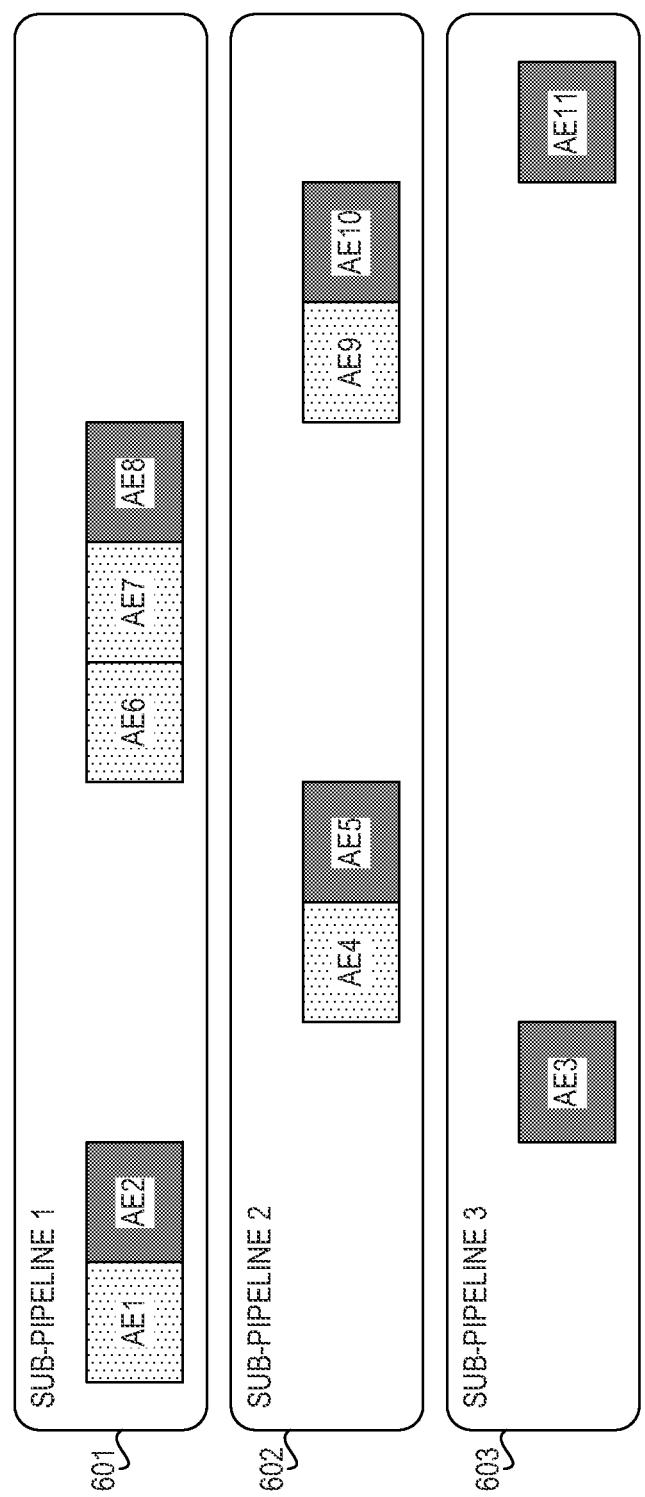

From the highest to lowest scored dependency tree, the mechanism creates a sub-pipeline consisting of the annotation engines included in the dependency tree. The mechanism creates these sub-pipelines until all annotation engines in the ingestion pipeline are covered. FIGS. 6A and 6B illustrate dividing the ingestion pipeline into sub-pipelines for partial ingestion in accordance with an illustrative embodiment. More particularly, FIG. 6A illustrates example sub-pipelines created from the dependency trees of three features. Sub-pipeline 1 601 includes dependency trees of a first feature, and annotation engines AE2 and AE8 contribute to the first feature. Sub-pipeline 2 602 includes dependency trees of annotation engines AE5 and AE10, which contribute to a second feature. Sub-pipeline 3 602 includes dependency trees of annotation engines AE3, AE6, and AE11, which contribute to a third feature.

The mechanism does not include annotation engines that have been included in a previous sub-pipeline. FIG. 6B illustrates example sub-pipelines after annotations that appear in an earlier pipeline have been removed.

In one example embodiment, the mechanism may use a rule to only create a sub-pipeline if it has at least a predetermined number of annotation engines to balance the cost of serialize/deserialize. Thus, in the example depicted in FIG. 6B, the mechanism may combine sub-pipeline 3 603 into sub-pipeline 2 602.

FIG. 7 is a block diagram illustrating a system for real-time or frequent ingestion by running sub-pipelines in order of effectiveness in accordance with an illustrative embodiment. Real-time or frequent ingestion pipeline 700 receives a set of input documents 702 and runs each input document through sub-pipelines 701-1 to 701-N. As content finishes each sub-pipeline, the sub-pipeline generates intermediate output 711-1 to 711-(N−1). Thus, sub-pipeline 1 701-1 generates intermediate objects 711-1, sub-pipeline 701-2 generates intermediate objects 711-2, and so on. The final sub-pipeline N 701-N receives intermediate objects 711-(N−1) and outputs to the fully ingested corpus 715.

Ingestion pipeline 700 uses a priority queue to ingest input documents 702. Thus, ingestion pipeline 700 uses the highest priority annotation engines in sub-pipeline 1 701-1 against input documents 702 before running the second highest priority annotation engines in sub-pipeline 2 701-2. Then, ingestion pipeline 700 runs sub-pipeline 2 701-2 against intermediate objects 711-1, which have already had the annotation engines in sub-pipeline 1 701-1 run against them, and so on.

In one example embodiment, the last annotation engine in each sub-pipeline 701-1 to 701-N deletes the intermediate output of the previous sub-pipeline. Therefore, intermediate objects 711-1 include input documents 702 that have been processed by sub-pipeline 1 701-1 but have not proceeded further in the ingestion pipeline 700, intermediate objects 711-2 include input documents 702 that have been processed by sub-pipeline 2 701-2 but have not proceeded further in the ingestion pipeline 700, and so forth.

Facade 710 provides access to partially ingested documents in intermediate objects 711-1 to 711-(N−1) and fully ingested corpus 715. In one example embodiment facade 710 is an application programming interface (API) including functionality for mapping input documents to partially ingested or fully ingested information and accessing the appropriate partially ingested or fully ingested content to QA system 720.

QA system 720 receives an input question 721 and generates one or more candidate answers from both partially ingested content in intermediate objects 711-1 to 711-(N−1) and fully ingested content in corpus 715. QA system 720 determines confidence scores for the candidate answers based on the features used; therefore, there is no need to change the scoring logic. As a consequence, it is possible for candidate answers based on partially ingested content to have inherently lower confidence scores as a function of the candidate answers being based on fewer features. Regardless, if the sub-pipelines 701-1 to 701-N are prioritized effectively, it is possible for QA system 720 to arrive at the same candidate answers as with fully ingested content.

In accordance with an example embodiment, facade 710 marks intermediate objects 711-1 to 711-(N−1) to indicate that the information is partially ingested and communicates this information to QA system 720. In turn, in the example embodiment, QA system 720 may optionally mark candidate answers as being based on partially ingested source material. Thus, the end user providing input question 721 is informed about the evidence for the candidate answers being provided by QA system 720.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 8 is a flowchart illustrating operation of a mechanism for providing sub-pipelines for partial ingestion of content in accordance with an illustrative embodiment. Operation begins (block 800), and the mechanism determines performance/runtime cost of each annotation engine (block 801). The mechanism may determine performance/runtime costs via MBeans, for example.

The mechanism then examines feature score weighting from a trained model (block 802). In one example embodiment, the mechanism uses scoring weighting from a typical training run; however, in an alternative embodiment, the mechanism uses scoring weighting from a subset of training questions with a given characteristic.

The mechanism starts with a highest weight feature (block 803) and identifies annotation engines that contribute to that feature (block 804). The mechanism then determines dependences of the annotation engines (block 805). The mechanism determines dependencies by examining metadata in the XML descriptor of each annotation engine or by analyzing the Java™ code for references to annotation types, for example. In determining dependencies in block 805, the mechanism builds dependency trees for each feature. Then, the mechanism determines an efficiency score for the feature (block 806).

The mechanism then determines whether the feature is the last feature (block 807). If the feature is not the last feature, operation returns to block 803 to consider the next highest weight feature.

If the feature is the last feature in block 807, the mechanism ranks the features by efficiency score (block 808). The mechanism then creates sub-pipelines of annotation engines (block 809). In one example embodiment, the mechanism creates a sub-pipeline for each feature from highest efficiency score to lowest until all annotation engines are covered. In another example embodiment, the mechanism removes an annotation engine from a sub-pipeline if the annotation engine is present in a higher ranked sub-pipeline. In yet another example embodiment, the mechanism combines a sub-pipeline into a previous or next sub-pipeline if the sub-pipeline has fewer than a predetermined number of annotation engines. Thereafter, operation ends (block 810).

FIG. 9 is a flowchart illustrating operation of a mechanism for real-time or frequency ingestion of content into a corpus in accordance with an illustrative embodiment. Operation begins (block 900), and the mechanism receives new content, such as one or more input documents (block 901). The mechanism processes the content using a highest ranked sub-pipeline (block 902). The mechanism then generates intermediate output (block 903) and removes previously generated intermediate output (block 904).

The mechanism then determines whether the content is fully ingested (block 905). The content is fully ingested if the content has been processed by all sub-pipelines, i.e., all annotation engines in the ingestion pipeline. If the mechanism determines the content has not been fully ingested, operation returns to block 902 to process the content using the next highest ranked remaining sub-pipeline.

If the mechanism determines the content is fully ingested in block 905, the mechanism stores the fully ingested output in the corpus of the QA system (block 906). Thereafter, operation ends (block 907).

Figure 10:
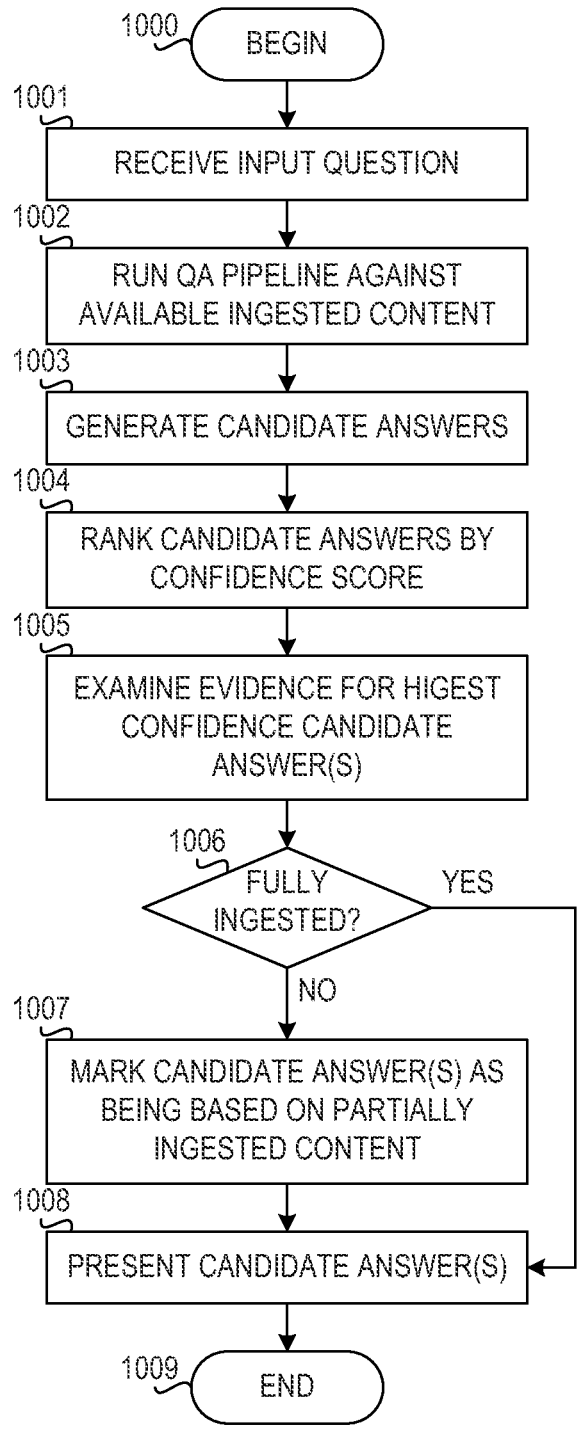
FIG. 10 is a flowchart illustrating operation of a mechanism for processing a question in a question answering system with real-time or frequent partial ingestion in accordance with an illustrative embodiment.

FIG. 10 is a flowchart illustrating operation of a mechanism for processing a question in a question answering system with real-time or frequent partial ingestion in accordance with an illustrative embodiment. Operation begins (block 1000), and the mechanism receives an input question (block 1001). The mechanism runs a question answering pipeline of software engines against all available ingested content in the corpus (block 1002). The mechanism generates candidate answers (block 1003) and ranks the candidate answers by confidence score (block 1004).

The mechanism examines the evidence for the one or more candidate answers having the highest confidence scores (block 1005). The mechanism determines whether the source content for the evidence of the highest confidence candidate answers has been fully ingested (block 1006). If the evidence has not been fully ingested, the mechanism marks the one or more candidate answers as being based on partially ingested content (block 1007). The mechanism then presents the candidate answers to the user (block 1008), and operation ends (block 1009).

If the mechanism determines the evidence for the highest confidence candidate answers has been fully ingested in block 1006, the mechanism presents the candidate answers to the user (block 1008). Thereafter, operation ends (block 1009).

Thus, the illustrative embodiments provide a mechanism for ingesting new content quickly and exposing partially ingested content to a question answering system. The mechanism determines aspects of the ingestion pipeline providing the biggest bang-for-the-buck. The mechanism divides the ingestion pipeline into sub-pipelines and runs each sub-pipeline in order of effectiveness, while respecting any dependencies that exist. The mechanism exposes the intermediate output files from new corpus content. As new content makes its way through the sub-pipelines, the mechanism exposes only the most fully ingested output files.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for partial ingestion of content, the method comprising:
   identifying a set of features that contribute to generating candidate answers for input questions;
   identifying a set of annotation engines in the ingestion pipeline that contribute to each of the set of features and at least one annotation engine on which the one or more annotation engines depend;
   generating a sub-pipeline for each set of annotation engines to form a plurality of sub-pipelines of annotation engines;
   receiving new content to be ingested into a corpus of information;
   applying the plurality of sub-pipelines of annotation engines against the new content in order of effectiveness, wherein the plurality of sub-pipelines include all annotation engines of an ingestion pipeline and wherein each sub-pipeline within the plurality of sub-pipelines generates one or more intermediate output objects; and providing access to the one or more intermediate output objects, wherein the one or more intermediate output objects represent the partially ingested new content.

2. The method of claim 1, further comprising responsive to applying all of the plurality of sub-pipelines, storing fully ingested new content in the corpus of information.

3. The method of claim 1, wherein identifying the set of features comprises examining feature score weighting from a trained model.

4. The method of claim 1, wherein generating a sub-pipeline for each set of annotation engines comprises:
  determining performance or runtime cost of each annotation engine in the ingestion pipeline;
  determining an efficiency score for each set of annotation engines based on the performance or runtime costs of the set of annotation engines and a feature score weighting of a corresponding feature; and
  ranking the sub-pipelines by efficiency score.

5. The method of claim 4, wherein generating a sub-pipeline for each set of annotation engines comprises for each sub-pipeline, removing annotation engines that are present in a next higher ranked sub-pipeline.

6. The method of claim 5, wherein generating a sub-pipeline for each set of annotation engines comprises combining a given sub-pipeline with a next higher or lower ranked sub-pipeline responsive to the given sub-pipeline having fewer than a predetermined number of annotation engines.

7. The method of claim 4, wherein applying the plurality of sub-pipelines of annotation engines against the new content comprises applying the plurality of sub-pipelines according to the ranking by efficiency score.

8. The method of claim 1, wherein each sub-pipeline within the plurality of sub-pipelines deletes one or more intermediate output objects generated by a previous sub-pipeline.

9. The method of claim 1, wherein providing access to the one or more intermediate output objects comprises mapping the new content being ingested to the one or more intermediate output objects.

10. The method of claim 9, further comprising:
  responsive to receiving an input question in a question answering system, running a question answering pipeline of software engines against available partially and fully ingested content according to the mapping;
  generating one or more candidate answers for the input question;
  ranking the one or more candidate answers; and
  presenting the ranked one or more candidate answers.

11. The method of claim 10, further comprising marking the given candidate answer as being based on partially ingested content responsive to determining evidence for the given candidate answer is partially ingested.

12. A computer program product comprising a computer readable storage medium having a computer readable program stored therein, wherein the computer readable program, when executed on a computing device, causes the computing device to:
  identify a set of features that contribute to generating candidate answers for input questions;
  identify a set of annotation engines in the ingestion pipeline that contribute to each of the set of features and at least one annotation engine on which the one or more annotation engines depend;
  generate a sub-pipeline for each set of annotation engines to form a plurality of sub-pipelines of annotation engines;
  receive new content to be ingested into a corpus of information;
  apply a plurality of sub-pipelines of annotation engines against the new content in order of effectiveness, wherein the plurality of sub-pipelines include all annotation engines of an ingestion pipeline and wherein each sub-pipeline within the plurality of sub-pipelines generates one or more intermediate output objects; and
  provide access to the one or more intermediate output objects, wherein the one or more intermediate output objects represent the partially ingested new content.

13. The computer program product of claim 12, wherein generating a sub-pipeline for each set of annotation engines comprises:
  determining performance or runtime cost of each annotation engine in the ingestion pipeline;
  determining an efficiency score for each set of annotation engines based on the performance or runtime costs of the set of annotation engines and a feature score weighting of a corresponding feature; and
  ranking the sub-pipelines by efficiency score.

14. The computer program product of claim 13, wherein applying the plurality of sub-pipelines of annotation engines against the new content comprises applying the plurality of sub-pipelines according to the ranking by efficiency score.

15. The computer program product of claim 12, wherein providing access to the one or more intermediate output objects comprises mapping the new content being ingested to the one or more intermediate output objects, wherein the computer readable program further causes the computing device to:
  responsive to receiving an input question in a question answering system, run a question answering pipeline of software engines against available partially and fully ingested content according to the mapping;
  generate one or more candidate answers for the input question;
  rank the one or more candidate answers; and
  present the ranked one or more candidate answers.

16. The computer program product of claim 15, wherein the computer readable program further causes the computing device to mark the given candidate answer as being based on partially ingested content responsive to determining evidence for the given candidate answer is partially ingested.

17. An apparatus comprising:
  a processor; and
  a memory coupled to the processor, wherein the memory comprises instructions which, when executed by the processor, cause the processor to:
  identify a set of features that contribute to generating candidate answers for input questions;
  identify a set of annotation engines in the ingestion pipeline that contribute to each of the set of features and at least one annotation engine on which the one or more annotation engines depend;
  generate a sub-pipeline for each set of annotation engines to form a plurality of sub-pipelines of annotation engines;
  receive new content to be ingested into a corpus of information;
  apply a plurality of sub-pipelines of annotation engines against the new content in order of effectiveness, wherein the plurality of sub-pipelines include all annotation engines of an ingestion pipeline and wherein each sub-pipeline within the plurality of sub-pipelines generates one or more intermediate output objects; and provide access to the one or more intermediate output objects, wherein the one or more intermediate output objects represent the partially ingested new content.

18. The apparatus of claim 17, wherein generating a sub-pipeline for each set of annotation engines comprises:
   determining performance or runtime cost of each annotation engine in the ingestion pipeline;
   determining an efficiency score for each set of annotation engines based on the performance or runtime costs of the set of annotation engines and a feature score weighting of a corresponding feature; and
   ranking the sub-pipelines by efficiency score.

19. The apparatus of claim 17, wherein providing access to the one or more intermediate output objects comprises mapping the new content being ingested to the one or more intermediate output objects, wherein the instructions further cause the processor to:
   responsive to receiving an input question in a question answering system, run a question answering pipeline of software engines against available partially and fully ingested content according to the mapping;
   generate one or more candidate answers for the input question;
   rank the one or more candidate answers; and
   present the ranked one or more candidate answers.

20. The apparatus of claim 19, wherein the instructions further cause the processor to mark the given candidate answer as being based on partially ingested content responsive to determining evidence for the given candidate answer is partially ingested.

* * * * *